UNITED STATES PATENT OFFICE.

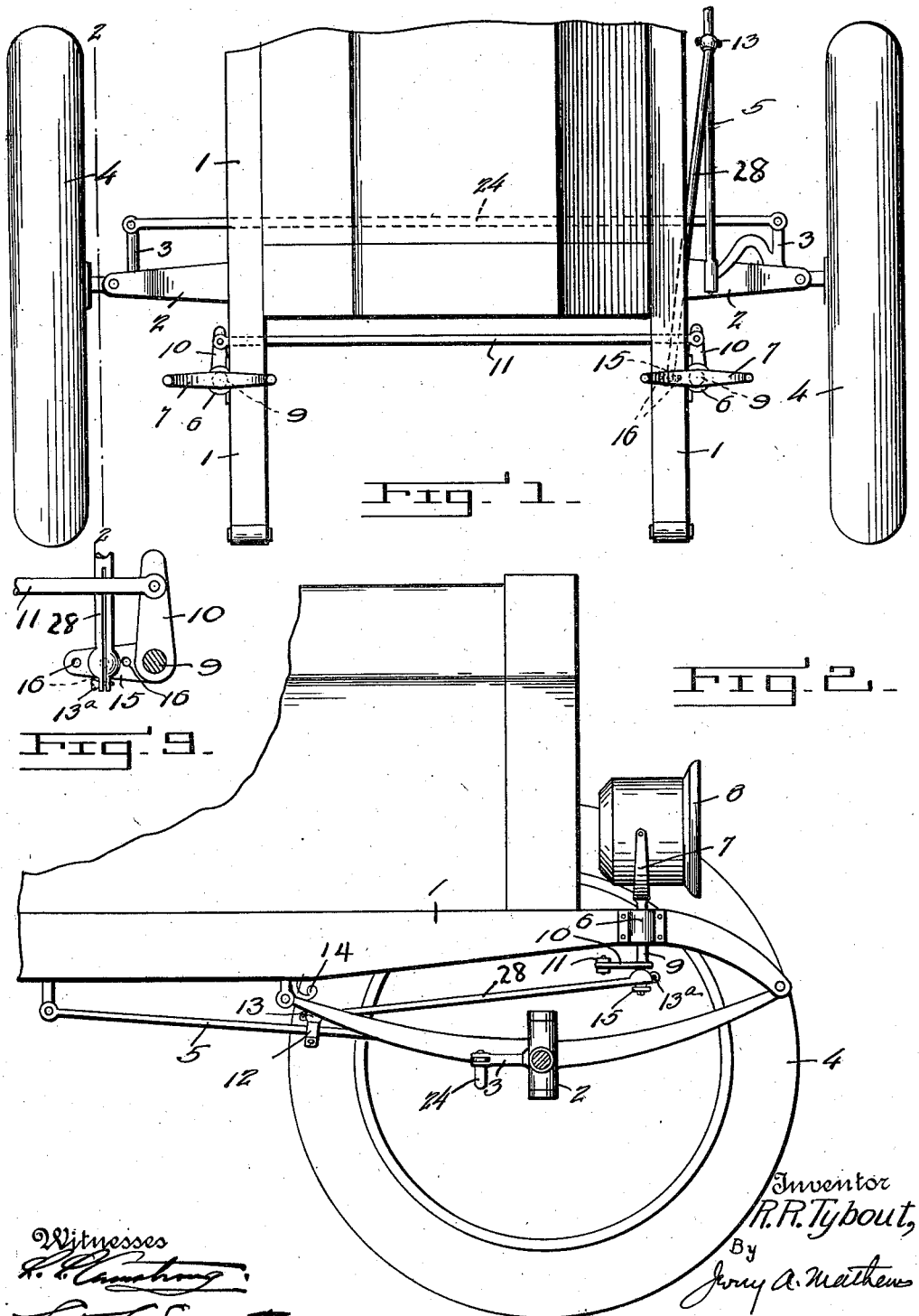

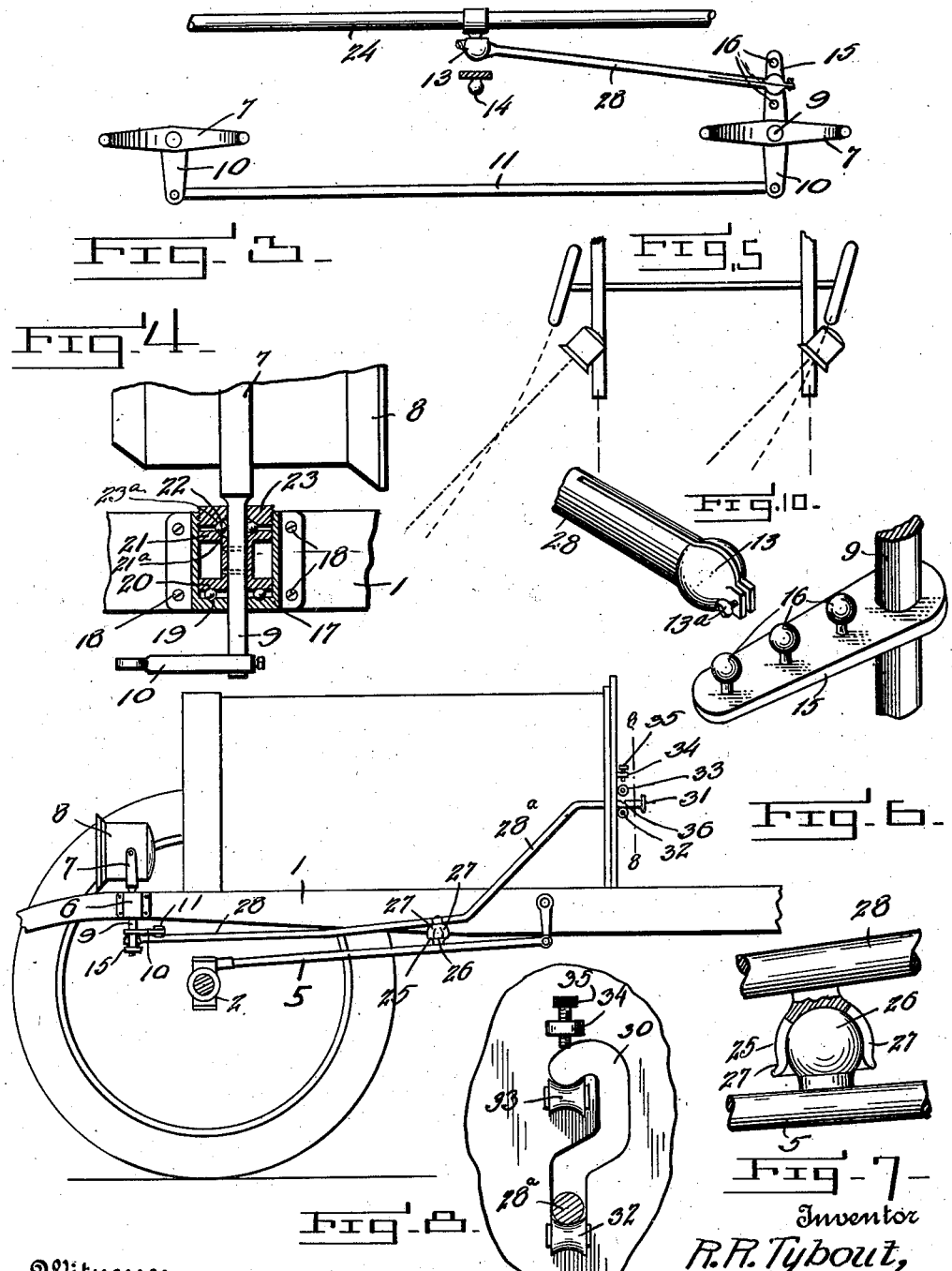
R. R. TYBOUT.
DIRIGIBLE VEHICLE HEADLIGHT.
APPLICATION FILED DEC. 3, 1915.
1,187,023.
Patented June 13, 1916.
2 SHEETS—SHEET 2.

RICHARD RAYMOND TYBOUT, OF WILMINGTON, DELAWARE.

DIRIGIBLE VEHICLE-HEADLIGHT.

1,187,023.  Specification of Letters Patent.  Patented June 13, 1916.

Application filed December 3, 1915. Serial No. 64,903.

*To all whom it may concern:*

Be it known that I, RICHARD RAYMOND TYBOUT, a citizen of the United States, residing at Wilmington, in the county of New Castle and State of Delaware, have invented a new and useful Dirigible Vehicle-Headlight, of which the following is a specification.

My invention relates to dirigible vehicle headlights, and it is the especial object of my invention to provide a novel automatically dirigible head light which can be adjusted to turn with an accelerating degree of rotation as compared with the front axle of the vehicle; to provide means for adjusting the mechanism to regulate the relative rotation of the axle of the vehicle and of the headlights so as to turn either in unison or at different degrees of rotation; and to provide means for fixing the headlights in stationary position relative to the vehicle.

It is further my object to provide novel mechanism for readily controlling the lights from the driver's seat by means of a hand lever, whereby the lights may be either adjusted to automatically rotate or to be fastened in a non-rotating relation to the vehicle so as to throw the light straight ahead, or to be turned at an angle to the vehicle and retained in such position.

It is further my object to provide means in a device of this nature for taking up lateral and vertical motion due to the jarring vibration of the vehicle and prevent such jarring from disarranging the entire mechanism.

It is my further object to provide improved ball bearing means for both lateral and vertical support of the standards on which the vehicle headlights are mounted.

It is also an object of my invention to provide novel means for releasably engaging the hand-operated lever for controlling the head light with the mechanism for automatically controlling the movement of the headlights.

It is an important object of my invention to provide an improved combination and arrangement of automatically dirigible headlight mechanism so arranged and designed as to eliminate all elements except those absolutely essential to the successful operation of the device, and adapted to withstand severe usage without becoming disarranged.

It is an object of my invention to provide novel means for accommodating lateral vibration of the headlight member and to provide novel means for adjustably retaining the ball bearings in engagement with the headlight supporting member.

With these and other objects in view as hereinafter set forth, I provide the mechanism illustrated in the accompanying drawings, in which—

Figure 1 is a top plan; Fig. 2 is a side elevation of the mechanism shown in Fig. 1 viewed from the line 2—2 of Fig. 1, the axle being shown in section on that line; Fig. 3 is a top plan of a modified construction; Fig. 4 is a detail sectional view of the lamp bearings, the lamp at the side of the machine (the right side in Fig. 1) opposite that directly connected to the rod 28 being illustrated in this figure; Fig. 5 is a diagrammatic view showing the path of the rays of light as compared with the path of the forward wheels of the vehicle in turning a corner, with the device adjusted to accelerate the rotation of the headlights as compared with that of the forward wheels and axle of the vehicle, reference being made to rotation about a vertical axis; Fig. 6 is a side elevation of the primary and preferred form of my invention disclosing means for rotating the lamps manually or automatically at will, the axle on the left side of the automobile being shown in section; Fig. 7 is a detail partly in section and partly in elevation of my snap spring ball socket joint mechanism for releasably engaging the manual control lever to the automatic dirigible mechanism; Fig. 8 is a detail of the slot 30 in the dash and the means for retaining the manual control lever 28 in either disengaged or engaged relation to rod 5, member 28 being shown in section; Fig. 9 is a detail of the means for adjusting the automatic headlight dirigible mechanism to different rates of acceleration of the rotation of the lamps about a vertical axis relative to corresponding rotation of the vehicle wheels, the view being taken on a section horizontally through standard 9 immediately below the lamp bearing mechanism, and applying equally to Figs. 1, 2 and 6; and Fig. 10 is a perspective detail view of pedicles 16.

Like characters of reference designate like parts throughout the several views.

Referring to the accompanying drawings, 1 designates the frame of an automobile or other vehicle; 2 designates the vehicle axle;

3 the steering knuckle; 4 the wheels of the vehicle; 5 the steering rod. Attached to the forward part of the frame 1 are ball bearing sockets 6, for the Y-shaped lamp brackets 7 supporting headlights 8. Attached to the depending stem 9 of the bracket 7 is a lamp steering arm 10 for each of the lamps. The arms 10 are connected or coupled by a suitable rod 11. It is optional to dispose of arms 10 and rod 11 either forward or rearward of lamp brackets 7 and stems 9. Attached to the steering rod 5, as at 12 in Fig. 2 is a suitable adjustable ball and socket connection 13 in the form of a split socket having preferably suitable flange portions by which it is adjustably fastened by means of suitable thumb screws 13$^a$ as illustrated in detail in Fig. 9. Ball and socket connection 13$^a$ connects with the laterally-extending arm 15 mounted beneath arms 10 on one of the standards 9. It is optional to dispose of the automatic steering mechanism at either side of the vehicle, as will be understood. Arm 15 is provided with suitable balls and pedicles 16 spaced apart to make possible any desired adjustment of automatic steering rod or lever 28 to arm 15, whereby to regulate the angle at which the lamps will turn relative to the wheels. Thus, for example the ball connection 16 nearest to lamp stem 9 when connected with rod 28 through member 13, would provide for approximately 60 per cent. acceleration of rotation about the vertical axes of the lamps as compared with the corresponding rotation of the vehicle wheels about their vertical axes. The ball and socket connection 15 permits of universal movement to allow for vibration of the vehicle, and may be readily engaged and disengaged by the adjustment of thumb screws regulating the engagement of a split socket identical in type with that heretofore described as employed at 12 in Fig. 2 and designated 13. When adjusted to the outermost position for connection on arm 15 the rotation of the lamps and of the vehicle wheels about their respective vertical axes would be substantially synchronous. This feature of the invention is important in that it permits of directing the vehicle lamp in advance of instead of in the direction in which the wheels have turned when the vehicle is rounding a corner.

As illustrated in Fig. 4 I provide a novel construction of lamp bearings, consisting of a shell 17 attached to the frame 1 by suitable fastening means 18. In the bottom of shell 17 is provided a suitable ball race 19 acting as a vertical supporting means for lower bearing member 20 which has its body portion rigidly affixed to lamp stem 9 and which has a top bearing portion 21 having novel inner inclined ball race portion 21$^a$. The function of portion 21$^a$ is to press ball bearings 22 which laterally support lamp stem 9 inwardly toward the lamp stem. A suitable threaded cap 23 which may be provided with any suitable slot or projection to make it readily adjustable (such portion not being illustrated), retains ball bearings 22 in place, the inclined portion 23$^a$ of member 23 tending to press the ball bearings inwardly against lamp stem 9 in similar manner to portion 21$^a$ of bearing member 22.

In Fig. 3 is disclosed a slightly modified form of my invention having steering arms 15 disposed in a rearwardly directed position as related to the lamps 8, and having a rod 28$^a$ connecting arm 15 with a steering axle 24 of the vehicle. Member 28$^a$ performs substantially the same function in this modified form of my invention as does member 28 in the form shown in Figs. 1, 2 and 6, it being provided with ball and split socket connections 13 and 16 arranged for adjustment in the manner heretofore described in detail. The arms 15 are positioned to extend rearwardly but their mode of operation is the same as that of the other figures.

The preferred form of my invention is disclosed in Fig. 6. In this form the automatic dirigible mechanism operates in substantially the same manner and by means of the same elements as have already been described. But in addition means are provided for manual control of the headlights at will, and for fixation of the headlights in non-rotatable relation to the vehicle, at will. In lieu of split socket and ball connection of members 28 and 5, I provide in the preferred form of my invention a novel snap socket connection 25 having suitable spring tongue members 27, as illustrated in detail in Fig. 7 arranged to snap in and out of engagement with ball member 26 on rod 5. This device permits of universal movement as between members 28 and 5, as in the other forms of my invention, but in addition permits of more ready—in fact instant—engagement and disengagement of those members. In the preferred form of my invention set forth in Fig. 6 I extend member 28 to a point within the dashboard within convenient reach of the driver's seat, said extended portion being designated by 28$^a$, which terminates in a suitable handle 31 by which the headlights may be operated manually. The member 28$^a$ is supported on the dash by a suitable concave roller 32 when snap socket connection 25 is in engaged position with ball 26 of steering rod 5, the roller 32 permitting of its sliding forward or rearward as the headlights are automatically directed with the turning of the vehicle axle. I provide a suitable slotted portion 30 in the dash to permit of manually shifting extended portion 28$^a$ of member 28 to an elevated position disengaged from steering rod 5, in which latter position member 28ª rests on a suitable conical roller 33. When in this position the headlights may be turned in any desired direction manually. And further, they may be secured in a forward non-rotatable relation to the vehicle by means of a suitable thumb screw 35, mounted to the dash by a suitable member 34. Member 35 is adapted to engage in a suitable slot 36, as illustrated in Fig. 6 to retain the lamps 8 in a non-rotatable relation to the vehicle when so desired.

Referring to the form of my invention disclosed in Figs. 1 and 2, the function of retaining the lamps in a nonrotatable position as related to the vehicle is performed by a novel ballpointed hook 14 rigidly attached to the vehicle frame 1 at a suitable portion thereof and positioned substantially above the ball and socket connection at 12 of the steering rod 5, and to which the split socket connection at 13 on the end of rod 28 is releasably engageable, it being required only that the ball portion of member 14 shall be of substantially the same size as the ball member affixed to steering rod 5. It is contemplated that the change of the mechanism from automatic dirigible action to fixation of the lights in this form of the invention will not be of frequent occurrence and that the adjustment by means of a split socket and thumb screws will be of no material disadvantage.

The operation of my invention has been described in connection with the foregoing description of the structure of the invention.

As illustrated, stems 9 of the lamps are operated by arms 15, which in turn are actuated by rods 28 (in Figs. 1, 2 and 6) and by rod 28ª which differs only in positioning and not in function, in the modified form of my invention disclosed in Fig. 3. The rod 28 is connected with steering rod 5 and actuated thereby automatically; and in similar manner corresponding rod 28 of Fig. 3 is connected with steering axle 24 to be automatically actuated thereby. The ball and socket joints set forth in the drawings and above description of structure operate to permit of universal movement and to render the device successful in operation notwithstanding vibration and strains to which it may be subjected. The plurality of ball connections 16 for arm 15 permit of adjustment of rod 28 to arm 15 either close to or farther from the axis about which the arm swings, thus permitting of regulating the rate of rotation of the lamps about a vertical axis compared with the rate of rotation of the vehicle wheels about a vertical axis for the purpose of accelerating the rotation of the lamps to throw the rays of light in advance of the direction in which the vehicle wheels are turning, as illustrated diagrammatically in Fig. 5, or to make possible their adjustment to turn synchronously with the turning of the wheels.

Referring to Fig. 6 the snap socket mechanism permits of ready disengagement of the automatic dirigible mechanism, and the retaining screw 35 permits of securing the lamps in a fixed relation to the vehicle.

What I claim is:

1. The combination in automatic dirigible headlight mechanism of operatively-connected headlights, a steering arm operatively connected to one of the headlight members' said steering arm having spaced pedicles, an automatic steering rod having a ball socket portion adapted to engage over one of the pedicles on the steering arm and having its end longitudinally divided through said ball socket portion and for a substantial distance beyond to permit of adjustment over the pedicle, fastening means for said ball socket portion, and universal joint means detachably connecting the automatic steering rod to the steering member of the vehicle.

2. In mechanism of the class described, mechanism to permit of manual control of headlight steering mechanism, comprising a control member releasably connectible to the steering rod, a plurality of rollers to support the aforesaid member one of said rollers being positioned to support the aforesaid member in position for manual control and the other roller being positioned to support the aforesaid member in position for automatic control, and a dashboard on which said rollers are mounted having a slotted portion for the movement of the control member from one roller to the other.

3. In automatic dirigible headlight mechanism, means for automatically directing vehicle headlights from the steering member of a vehicle in combination with lamp supporting means comprising a lamp stem, a socket member adapted to be fastened to the vehicle frame, ball bearings mounted on said member to provide vertical support, a substantially spool-shaped member supported by said ball bearings and affixed to the lamp stem, said member having an upper annular inclined portion, ball bearings thereon positioned to contact with the lamp stem to bear against same laterally, and a cap member releasably engaging over the ball bearings to the socket member and having a lower annular inclined portion adapted to press the ball bearings toward the lamp stem to adjustably support the lamp mechanism, substantially as described.

4. In mechanism of the class described, mechanism to permit of manual control of headlight steering mechanism, comprising a control member releasably connectible to the steering rod, a plurality of rollers to support the aforesaid member one of said rollers being positioned to support the aforesaid member in position for manual control and the other roller being positioned to support the aforesaid member in position for automatic control, a dashboard on which said rollers are mounted having a slotted portion for the movement of the control member from one roller to the other, and means adapted to releasably engage the control member to secure same in fixed position.

5. The combination in automatic dirigible headlight mechanism of operatively connected headlights, a steering arm operatively connected to one of the headlight members, said steering arm having spaced pedicles, an automatic steering rod having ball socket portions at opposite ends, each socket portion being longitudinally divided for a substantial distance beyond and through said socket portion to permit of adjustment over a pedicle, one of the ball socket portions being adapted to engage over any one of the pedicles on the steering arm, and the ball socket portion at the reverse end of the steering rod being adapted to engage either over a pedicle carried by a steering member of the vehicle to automatically control the headlights or over an alined pedicle having a fixed relation to the vehicle body to effect fixation of the headlights at will, and pedicle members mounted as described, substantially as and for the purposes set forth.

RICHARD RAYMOND TYBOUT.

Witnesses:
LESTER L. SARGENT,
CHAS. E. BRECKONS.

Copies of this patent may be obtained for five cents each, by addressing the "Commissioner of Patents. Washington, D. C."